Feb. 6, 1951  J. W. GABEL ET AL  2,540,780
ULTRAVIOLET SPECTROPHOTOMETER
Filed Feb. 26, 1949  3 Sheets—Sheet 3
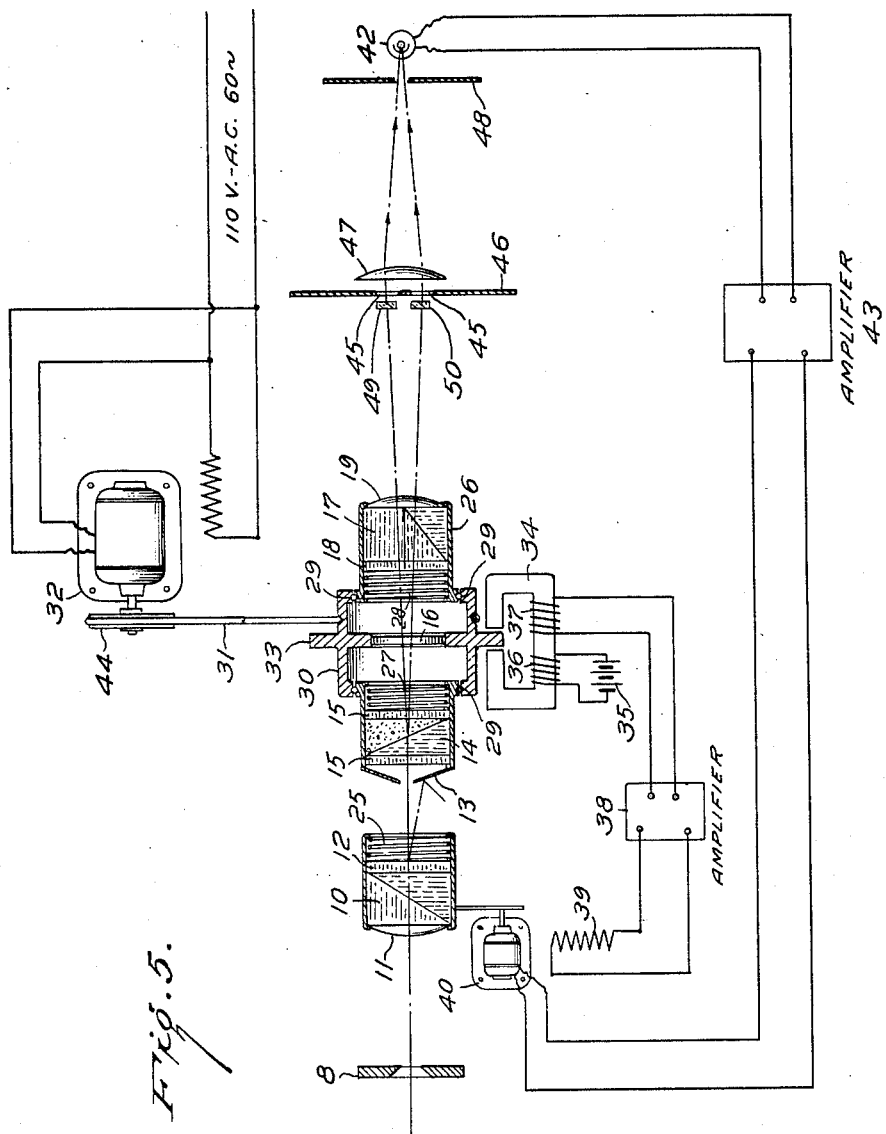
Fig. 5.
INVENTORS
JOSEPH W. GABEL,
GEORGE L. BUC,
BY
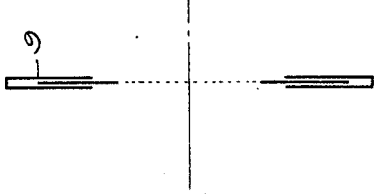
ATTORNEY Patented Feb. 6, 1951

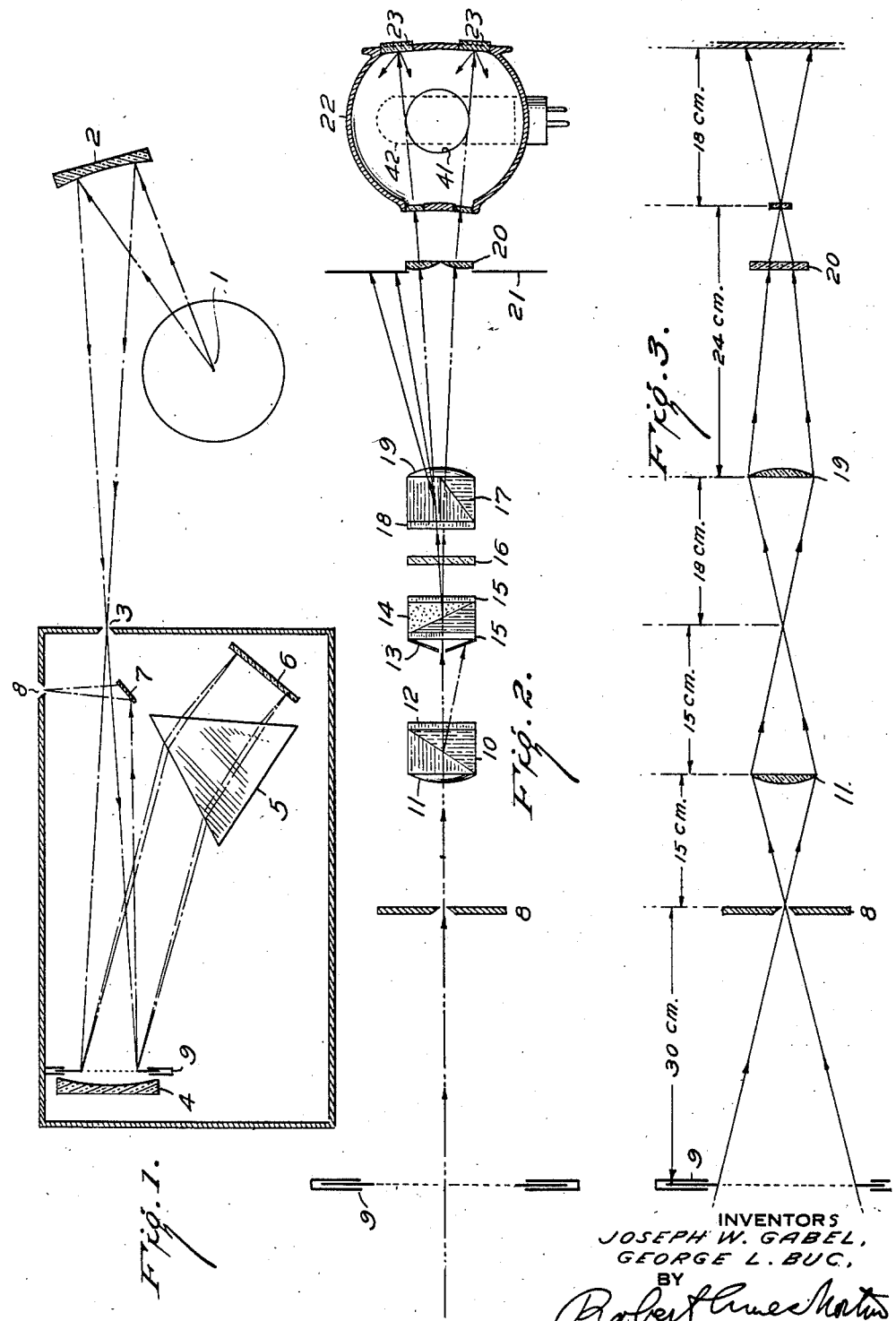

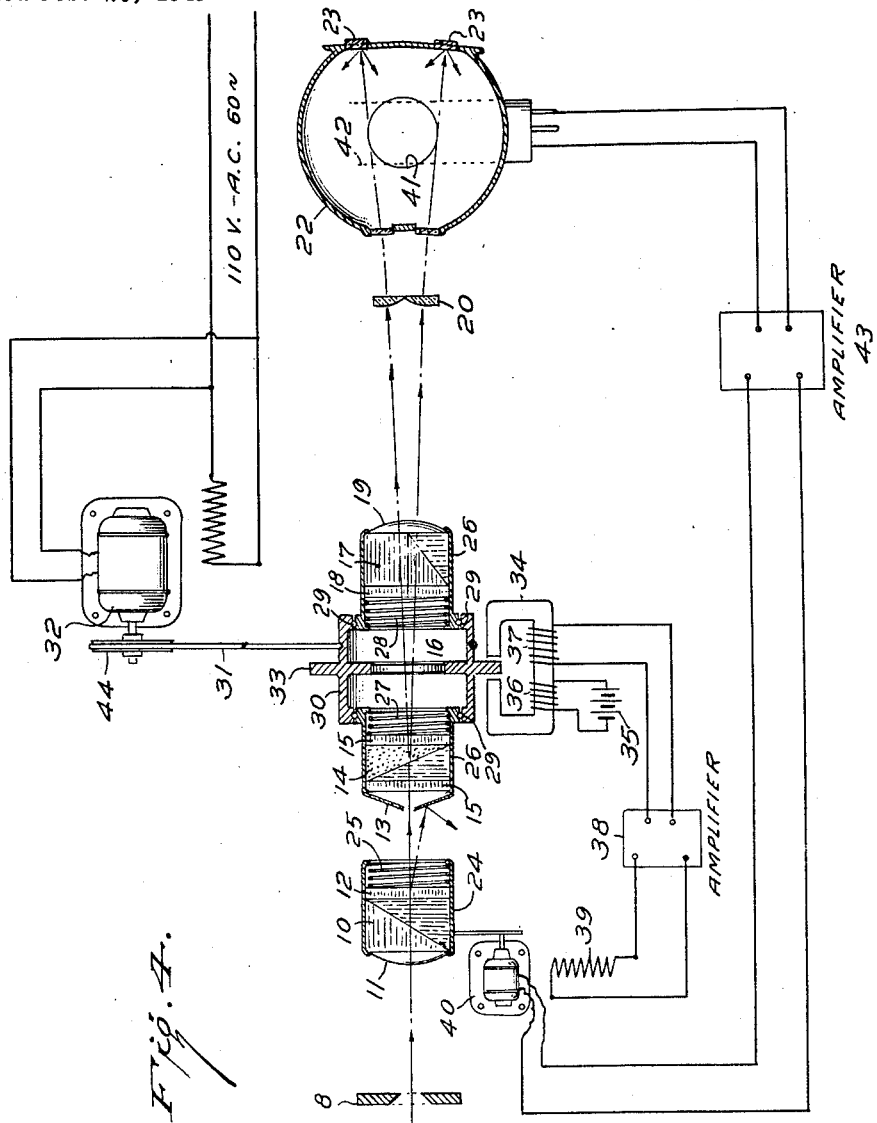

2,540,780

UNITED STATES PATENT OFFICE 2,540,780

ULTRAVIOLET SPECTROPHOTOMETER

Joseph W. Gabel, Somerville, and George L. Buc, West Orange, N. J., assignors to American Cyanamid Company, New York, N. Y., a corporation of Maine Application February 26, 1949, Serial No. 78,546

9 Claims. (Cl. 250—83)

This invention relates to ultraviolet photometric devices utilizing polarization photometering.

A number of types of photometering instruments have been developed for use in the visible spectrum employing polarizing elements to effect comparison photometering. These devices employ a Wollaston prism associated with one or more Nicol or Rochon prisms. One of the simplest instruments of this type is a Martens photometer in which light beams from a sample and standard pass through a Wollaston prism which plane polarizes them at right angles to each other. Prisms such as a Nicol or Rochon effect photometering. The same photometering system is also used in the Koenig-Martens spectrophotometer in which the photometering portion is the same but the light from standard and sample are passed through a monochromator so that photometering can be effected at various wave lengths throughout the spectrum.

In more recent years polarized flickering beam spectrophotometers have achieved great success and their speed and precision account for their predominant position. All of these types of instruments have the common characteristic that beams are produced from a Wollaston prism plane polarized at right angles to each other and are photometered by passing either before or after the Wollaston prism through a rotatable polarizing element, the rotation of which varies the relative intensity of the two beams.

The photometering elements, namely, Wollaston and Nicol and Rochon prisms depend for their operation on the use of birefringent material, that is to say, material which has a different refractive index parallel to the crystal axis from that at right angles thereto. It is also necessary that the material be obtainable in large crystals to permit optics of sufficient physical dimensions to have adequate sensitivity.

In the visible range calcite is almost ideal. It has good transmission, very high birefringence, and can be obtained in a reasonable crystal size, although very large calcite crystals of the requisite purity are somewhat rare and command a high price. The desirable properties of calcite have made polarizing photometers useful throughout the visible spectrum, and for a certain distance in the near infrared. However, such instruments have not been useful in the ultraviolet, at least beyond the very long ultraviolet immediately adjacent to the visible spectrum. The transparency of calcite falls off in the ultraviolet so fast that it cannot be used. Thus, for example, for all practical purposes a plate of calcite 4 centimeters thick is opaque to ultraviolet light at wavelengths from 230 millimicrons down. Instruments using polarizing photometering have, therefore, been unsuitable hitherto for use with ultraviolet.

The only birefringent material which was known to have satisfactory transmission characteristics in the ultraviolet is quartz, but its birefringence is so small, the difference between refractive index of ordinary and extraordinary rays being of the order of 0.01, which is inadequate for practical polarizing optics.

The present invention utilizes ammonium dihydrogen phosphate the use of which as a birefringent material is new. This material has five times the birefringence of quartz and shows good transmission in the ultraviolet. The transmission of a plate of ammonium dihydrogen phosphate about 2.1 cm. thick when compared to air is shown in the following table.

| mu | T Per-cent | mu | T Per-cent |
|---|---|---|---|
| 400 | 85.7 | 330 | 87.9 |
| 395 | 87.0 | 325 | 86.3 |
| 390 | 87.3 | 320 | 86.5 |
| 385 | 88.0 | 310 | 86.5 |
| 380 | 87.8 | 300 | 86.4 |
| 375 | 87.8 | 290 | 85.6 |
| 370 | 87.8 | 280 | 86.1 |
| 365 | 87.7 | 270 | 86.0 |
| 360 | 87.2 | 260 | 85.3 |
| 355 | 87.2 | 250 | 84.8 |
| 350 | 87.0 | 240 | 84.5 |
| 345 | 87.1 | 235 | 83.6 |
| 340 | 87.2 | 230 | 84.0 |
| 335 | 87.7 | 220 | 81.4 |
|  |  | 215 | 82.0 |

The advantages of the present invention for an ultraviolet photometric instrument are obtained without any disadvantages from the standpoint of size of optics. On the contrary, it is readily possible to produce uniform single crystals of ammonium dihydrogen phosphate at moderate cost in dimensions much larger than are normally obtainable in calcite crystals. In other words, it is possible to use even bigger optics with higher sensitivity than is the case with standard instruments used in the visible range.

Unfortunately it is not desirable to substitute polarizing optics of ammonium dihydrogen phosphate for the ordinary calcite optics in standard spectrophotometers without modification. When it is attempted to do this, the device will not operate at high efficiency because the deviation of the beams produced by a Wollaston prism of practical thickness is so small that a mixing of the edges of the two beams occurs in the near ultraviolet and, of course, to an even greater extent in the visible spectrum. This problem is solved by a different organization of optics in order to produce an instrument of useful range.

In addition to the substitution of ammonium dihydrogen phosphate in the polarizing optics, it is necessary to use a different positioning of lenses, a new type of retardation flickering and a variable beam field stop. When the optics of a recording spectrophotometer are changed in accordance with the present invention, an instrument is produced which is not only useful far into the ultraviolet but can also be used in the visible spectrum, making it unnecessary to have a separate spectrophotometer for ultraviolet use.

While all of the elements described above must be used to obtain the preferred result of an instrument which is usable at maximum efficiency throughout a wide range of radiation, some of these elements are in themselves new and are not claimed in the present application except in conjunction with the combination which constitutes the invention.

The difficulty encountered because of the low deviation of the two beams from the Wollaston prism of a flickering beam spectrophotometer is overcome by a combination of variable field stop and lens placement. In the first place there must be a very sharply defined beam striking the Wollaston prism in order to minimize overlapping of beams. Thus, the exit slit of the monochromator is imaged on or very close to the face of the Wollaston prism and preferably a sharp cutting mask is used to prevent scattered light from passing further through the instrument.

The low deviation of the Wollaston prism in the present invention causes difficulties when decentering of the two beams is employed, or when they are separated by slits in a mask. At this point there is preferably an image of the effective field stop of the monochromator exit beam. Unfortunately the amount of deviation decreases with increasing wavelength and therefore if the instrument is used at longer wavelengths the physical dimensions of the two beams become so large that they overlap, which destroys the accuracy of the instrument. On the other hand, if a monochromator is used with a very small fixed field stop of the exit beam, the instrument becomes impractical in the far ultraviolet because there the amount of energy from available sources is only a fraction of that obtainable at longer wavelengths, and transmission of the optical elements also falls off at the shorter wavelengths, such as those encountered in the far ultraviolet.

The problem of beam size and energy is solved in the present invention by providing a variable field stop of the monochromator exit beam. This may be of the conventional iris diaphragm type, or any other suitable, adjustable design, and may advantageously be incorporated in the monochromator itself. At very short wavelengths in the ultraviolet, the diaphragm may be opened wide because at these wavelengths the deviation of the Wollaston prism is at a maximum. It is thus possible to utilize a maximum of light in the range where the efficiency of the light source is at its lowest. As the wavelength increases, and the deviation of the two beams from the Wollaston prism decreases, the field stop diaphragm can be closed more in order to keep the size of the beams small enough to prevent material overlapping. The reduction in light which results can be accepted because at these longer wavelengths the light source and optics are much more efficient.

It should be noted that over a narrow range the instrument can be operated with a fixed field stop and this is described and claimed in our copending application Serial No. 687,579, filed August 1, 1946 (now abandoned), of which the present application is in part a continuation. However, the instrument there described is efficient only over narrower ranges and is not as versatile as the preferred modification described in the present application.

Operation in the ultraviolet presents a serious problem of cementing. The double prisms used in the polarizing optics must be cemented. Unfortunately, however, all of the ordinary optical cements absorb very strongly in the far ultraviolet and cannot, therefore, be used effectively in an instrument which is to operate at short wavelengths. We have found that it is possible to purify a saturated hydrocarbon oil such as the one sold for medicinal use under the trade name "Nujol." It is necessary to remove, to a very high degree, unsaturated contaminants, which can be effected by silica gel absorption from a solution of the viscous hydrocarbon oil in a volatile hydrocarbon such as cyclohexane.

The highly purified, saturated aliphatic hydrocarbon oil has ideal optical characteristics as an optical cement, but unfortunately will not set and therefore cannot be used to impart mechanical strength to cemented prisms. This drawback can be overcome by mounting the prism in suitable metal sleeves and maintaining it under spring pressure so that the hydrocarbon cement operates only as an optical cementing liquid and does not have to perform any mechanical cementing functions. We do not claim this method of mounting ammonium dihydrogen phosphate generally except in conjunction with the other features present in the invention.

The desirability of using a saturated hydrocarbon cement with accompanying spring-loaded mountings presents a very serious mechanical problem in the construction of a flicker device because of the physical size and mechanical properties of the mounting components. We prefer, therefore, to use retardation plate flickering which can be incorporated into a mounting permitting drive from an external motor. It is possible to effect flickering by using a half wave plate of bi-refringent material. However, for use in the far ultraviolet this necessitates a quartz plate so thin as to present a serious problem of mechanical strength and rigidity. We prefer, therefore, although the invention is not broadly limited thereto, to employ a multiple retardation plate in the flicker means. This results in 50% flickering efficiency through a very wide range encompassing the ultraviolet and visible spectra. Where instruments are to be used in the extremely short wave ultraviolet range, a very thin half wave plate may be employed in order to obtain higher flickering efficiency, and such special purpose instruments are included in the present invention although their field of utility is much more restricted than the preferred, more general purpose instrument using multiple retardation plate flickering.

The preferred design of flickering mechanism, which will be described in connection with certain specific modifications of the invention, also makes it possible to use a flicker frequency which differs from the line frequency of the alternating current used in the spectrophotometer, and avoids difficulties resulting from spurious signals and harmonics.

The flickering mechanism is not claimed in the present application except as part of the combination representing the invention. The mechanism itself forms the subject matter of a copending application of Gabel and Loukomsky, Serial No. 153,268, filed March 31, 1950.

Except for the adjustable field stop diaphragm, the present invention can be used with monochromators of standard design, of course using quartz optics when operation in the ultraviolet is desired. The light source may be of standard type; in fact, the preferred modifications of the present invention, preferred modifications of the present invention, permitting maximum beam dimensions at the point of lowest light source efficiency, reduces the problem presented by the light source very materially. This is a further advantage of the present invention.

The invention will be described in greater detail in conjunction with the drawings in which:

Fig. 1 is a section through a monochromator;

Fig. 2 is a diagrammatic horizontal section through a recording spectrophotometer of the present invention, using an integrating sphere;

Fig. 3 is a diagrammatic vertical section through the center of Fig. 2 showing only the lenses and image system;

Fig. 4 is a horizontal section of a spectrophotometer using an integrating sphere; and Fig. 5 is a section, similar to Fig. 4, showing a different type of integrating mechanism.

The monochromator shown in Fig. 1 includes a source of light 1, from which a beam is focused by the converging mirror 2, onto the entrance slit 3, of the monochromator proper. From this slit the beam passes to a second converging mirror 4, thence through a quartz prism 5, to a movable plane mirror 6, which reflects back through the prism to the mirror 4, converging the beam onto the mirror 7, and out through an exit slit 8. The physical dimensions of the beam are varied by the iris diaphragm 9, in front of the mirror 4.

Figs. 2 and 3 show the optics and image system of a spectrophotometer in schematic form. For convenience in following the path of the rays, the exit slit 8, and diaphragm 9, are shown in the same straight line, whereas in the actual monochromator illustrated in Fig. 1, the beam is turned through 90° between these two elements. The beam from the exit slit 8, strikes a photometering Rochon prism 10, constructed from ammonium dihydrogen phosphate crystals and provided with a quartz lens 11, and protective thin quartz rear plate 12. The plane polarized light emerging from the photometering prism passes through a slot in the mask 13, with inclined blades, which reflect the unwanted ray to the side out of the optical path of the instrument. The blades are preferably of polished reflecting material. Just behind the slot 13, is a Wollaston prism 14, of ammonium dihydrogen phosphate provided with thin protective quartz plates 15. The placement of elements and focal length of the lens 11, are so chosen that the slit 8. is imaged onto the slot in the mask 3 in front of the quartz plate 15. The ray path is shown in Fig. 3. Plate 12 and the front plate 15 are optically matched in thickness with their optic axes normal to their faces, one being of right handed and the other left handed quartz.

In passing through the Wollaston prism the beam of polarized light is transformed into two divergent beams plane polarized at right angles to each other. These beams then pass through a multiple retardation plate 16, which may, for example, be a quartz plate of 6.0 mm. thickness in which, when used with a slit 8 passing 3 millimicrons, provides for a difference in the number of retardation cycles of approximately 4 for a range from 220 millimicrons to 400 millimicrons. The mechanism for rotating the retardation plate will be described in more detail in conjunction with Fig. 4. The retardation of the two beams varies in opposite phase, and they then pass through a stationary Rochon prism 17 of ammonium dihydrogen phosphate, provided with a protective quartz plate 18, and a quartz lens 19. The function of the stationary Rochon prism is to cause the two beams to pulsate from maximum to minimum in opposite phase. They then strike two decentering lenses 20, provided with a mask 21, to keep the unwanted rays out of the optical path in the instrument. From Fig. 3 it will be noted that the iris diaphragm 9, which acts as a field stop is imaged onto two decentering lenses.

After passing through the decentering lenses, the two beams, now diverging at a greater angle, pass through the two windows of an integrating sphere 22. provided with two holders 23, for sample and standard. It will be noted from Fig. 3 that the exit slit of the monochromator is imaged on the plane of the two windows of the integrating sphere and the aperture of lens 19 is imaged on the targets in the two holders 23.

Fig. 4 shows the actual mechanical design of the spectrophotometer, the same parts bearing the same reference numerals as Figs. 2 and 3.

The photometering Rochon prism 10 is mounted in a sleeve 24, and the lens 11. and quartz plate 12, are under compression from the spring 25. This serves as a mechanical means for maintaining the two parts of the photometering prism in contact. The two pieces of ammonium dihydrogen phosphate are maintained in optical contact by a microscopically thin film of saturated aliphatic hydrocarbon between them. The same optical cement is used in all of the other ammonium dihydrogen phosphate optics. The Wollaston prism 13, and stationary flicker prism 17, are mounted in rigid sleeves 26, which, in turn, are mounted on the main framework of the spectrophotometer (not shown). The two halves of each prism are maintained in contact by springs 27 and 28, bearing on the quartz plate 15 of the Wollaston prism and the plate 18 of the Rochon prism respectively. On the sleeves 26, there are mounted two ball bearings 29, on which rotates an outer hollow sleeve 30, carrying the retardation plate 16, and being driven through a belt 31, by a synchronous motor 32, energized from ordinary 60-cycle alternating current. The sleeve 30, is provided with four lobes 33, passing through the gap of an electromagnet 34, energized by a battery 35, through the coil 36. A second coil 37, around the magnet core picks up alternating current induced by the lobes 33 on the rotating sleeve 30. This alternating current is fed into an audiofrequency vacuum amplifier 38, of conventional design. The output of this amplifier energizes the field 39, of the motor 40, which turns the sleeve 24, of the photometering Rochon prism.

The integrating sphere 22, is of conventional design with an opening 41, and a phototube 42, which is connected into the input circuit of an extremely high-gain audiofrequency amplifier 43. The output of this amplifier is connected to the armature of the motor 40.

The size of the pulley 44, on the motor 32, is chosen so that the sleeve 30 rotates at a speed to induce an alternating current of approximately 79 cycles in the coil 37.

The operation of the spectrophotometer is similar to the ordinary type of flickering beam polarized light spectrophotometers which have been used extensively in the visible region; that is to say, when the reflectance from the sample and standard in the integrating sphere are equal at any particular wavelength, there is no light pulsation in the integrating sphere at flicker frequency, and hence no flicker frequency signal input to the amplifier 43, therefore there is no flicker frequency component in the amplified output passing through the armature of the motor 40, and the sleeve 24 of the photometering prism does not turn.

When the reflectance at another wavelength of sample and standard are not the same, the light in the integrating sphere will pulsate at flicker frequency in phase with the beam which shows the stronger reflection. Flicker frequency electrical current is produced in the phototube and amplified by the amplifier 43. This causes the motor 40, to turn, the phase being so chosen that the resulting rotation of the photometering prism 10 is in a direction to reduce the stronger beam and increase the weaker beam. The photometering prism turns until the integrated light in the sphere is once more balanced. The degree of rotation of the photometering prism is a measure of the relative reflectance or transmission of the sample as compared to the standard. This mechanical displacement may be used to operate the conventional type of recording means which are standard in flickering beam spectrophotometers. As this portion of the instrument has nothing to do with the present invention it is not shown.

The use of a flicker frequency which does not exactly coincide with the frequency of the 60-cycle line prevents spurious 60-cycle signals in the amplifier 43, or harmonics thereof. Stage shielding and filtering of the amplifier 43 are thereby simplified. The use of 79 cycles as the flicker frequency, which has just been described, is in no sense critical and is merely typical of a frequency differing from 60 cycles by an amount sufficient to prevent spurious signals and generation of unwanted beat frequencies with 60 cycles or harmonics. Any other suitable frequency may be chosen by proper dimensioning of the drive of the sleeve 30 from the motor 32.

In practical operation in the far ultraviolet, the iris diaphragm 9, is open because at these very short wavelengths the deviation of the two beams leaving the Wollaston prism is sufficient so that no material overlapping of beams results at the decentering lenses 20. As the monochromator moves through the ultraviolet spectrum to longer and longer wavelengths, the iris diaphragm is closed to maintain the physical size of the beams small enough so that no overlapping takes place. As the machine passes from the ultraviolet through the visible spectrum, the iris diaphragm is closed further and further producing a comparatively small beam. However, at these longer wavelengths the efficiency of light sources and optics is so high that sufficient light is no problem.

The operation of the iris diaphragm may be manual, or it may be driven from the monochromator wavelength drive.

Fig. 5 illustrates a different type of integration which is useful only for transmission samples, but has the great advantage that for these samples its efficiency is enormously greater than that of an integrating sphere. In this modification the decentering lenses are replaced by two openings 45, in a mask 46. Behind the openings is located a lens 47, which focuses both beams onto the phototube 42 through a small opening in mask 48. Since the light from both beams, after passing through transmission sample and standard cells 49 and 50, is focused onto the same phototube, it is integrated and the operation of the instrument is identical with that described in Fig. 4. The efficiency, however, is much greater because substantially all of the light of each of the beams is impressed on the phototube, whereas the multiple reflections of an integrating sphere absorb so much light that the phototube, at best, receives only a few percent of the incident light into the sphere. For transmission samples, therefore, the modification of Fig. 5 presents advantages. However, it lacks the flexibility of the modification using an integrating sphere which can be used either for reflectance or transmission measurements. The greater versatility of this modification renders it preferable.

Figs. 2 and 3 show element and lens placements of a typical machine. It should be understood that the spacings depend on the focal length of the lenses used and the invention, therefore, is not limited to the exact spacings shown which are illustrative only.

We claim:

1. A flickering beam ultraviolet spectrophotometer comprising, in series and in optical alignment, a source of ultraviolet light, an ultraviolet monochromator provided with an exit slit, a rotatable polarizing prism, double prismatic means for splitting a beam of polarized light into two divergent beams of light plane polarized at right angles to each other, means for causing the two beams to flicker in opposite phase, slotted means for masking said double prismatic means from the unwanted ray from the polarizing prism, and means for imaging the monochromator slit substantially on the slot of the masking means, the prisms being constructed of ammonium dihydrogen phosphate crystals.

2. A spectrophotometer according to claim 1 comprising means for holding a sample and standard, respectively, in the two beams, a photoelectric device, means for integrating the light from the flickering beams and for causing said integrated light to impinge on the photoelectric device, electric driving means for the polarizing prism responsive to alternating current of flicker frequency, a flicker frequency vacuum tube amplifier the input of which is connected to the photoelectric device and means for applying the amplified flicker frequency output of the amplifier to the electric driving means in phase to rotate the polarizing prism in a direction to maintain the same total light from the sample and standard.

3. A spectrophotometer according to claim 2 in which the flickering means comprises a rotatable multiple retardation plate and a stationary polarizing prism of ammonium dihydrogen phosphate.

4. A spectrophotometer according to claim 3 in which the means for integrating the light from the two flickering beams comprises an integrating sphere provided with inlet windows and holders for reflectance samples and standards in alignment therewith, decentering lenses in the flickering beams between the stationary polarizing prism and the integrating sphere, an adjustable beam field stop between the light source and the double prismatic means and means for imaging said field stop on each of the decentering lenses.

5. A spectrophotometer according to claim 2 in which the means for integrating the light of the flickering beams comprises a mask with two restricted openings registering with the flickering beams, means for imaging both openings onto the photoelectric device, an adjustable beam field stop between the light source and the double prismatic means and means for imaging said field stop on the two restricted openings.

6. A spectrophotometer according to claim 2 in which the double prismatic means and the stationary polarizing prism are mounted under spring compression in stationary aligned sleeves, a sleeve rotatable with respect to the two stationary sleeves and having mounted therein a multiple retardation plate and synchronous means for rotating said sleeve at quarter flicker frequency.

7. A spectrophotometer according to claim 6 in which the rotating sleeve carrying the multiple retardation plate is provided with four ferromagnetic metal lobes, a reluctance generator with a gap positioned so that the lobes move successively therethrough, a flicker frequency amplifier, means connecting the input of said amplifier to a coil on said generator and means connecting the output of said amplifier to the electric driving means for the rotating polarizing prism, the rate of rotation of rotating sleeve being adjusted to produce a flicker frequency differing from the frequency of the line to the synchronous driving means for the sleeve.

8. A spectrophotometer according to claim 1 in which the ammonium dihydrogen phosphate crystals in the polarizing prisms are mounted in sleeves and provided with compression springs and the cemented faces of the prisms being cemented with a liquid consisting of saturated aliphatic hydrocarbons.

9. A spectrophotometer according to claim 2 in which the ammonium dihydrogen phosphate crystals in the polarizing prisms are mounted in sleeves and provided with compression springs and the cemented faces of the prisms being cemented with a liquid consisting of saturated aliphatic hydrocarbons.

JOSEPH W. GABEL.
GEORGE L. BUC.

REFERENCES CITED

The following references are of record in the file of this patent:

UNITED STATES PATENTS

| Number | Name | Date |
|---|---|---|
| 2,359,734 | Hood | Oct. 10, 1944 |
| 2,383,075 | Pineo | Aug. 21, 1945 |
| 2,467,325 | Mason | Apr. 12, 1949 |